2 Sheets—Sheet 1.
E. BROWN.
Till Alarm.
No. 924. Reissued March 6, 1860.
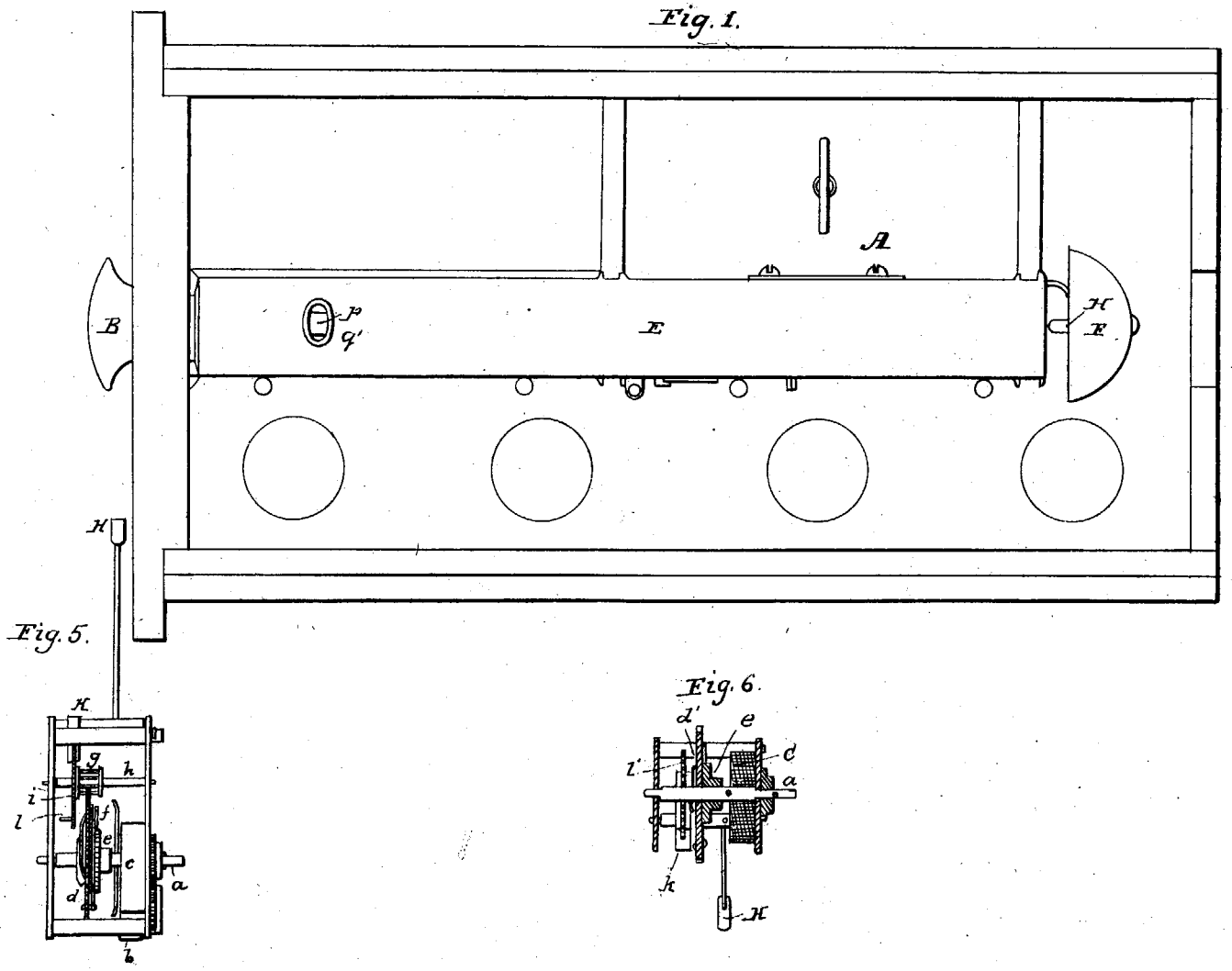
N. PETERS, Photo-Lithographer, Washington, D. C.

2 Sheets—Sheet 2.
E. BROWN.
Till Alarm.
No. 924.
Reissued March 6, 1860.
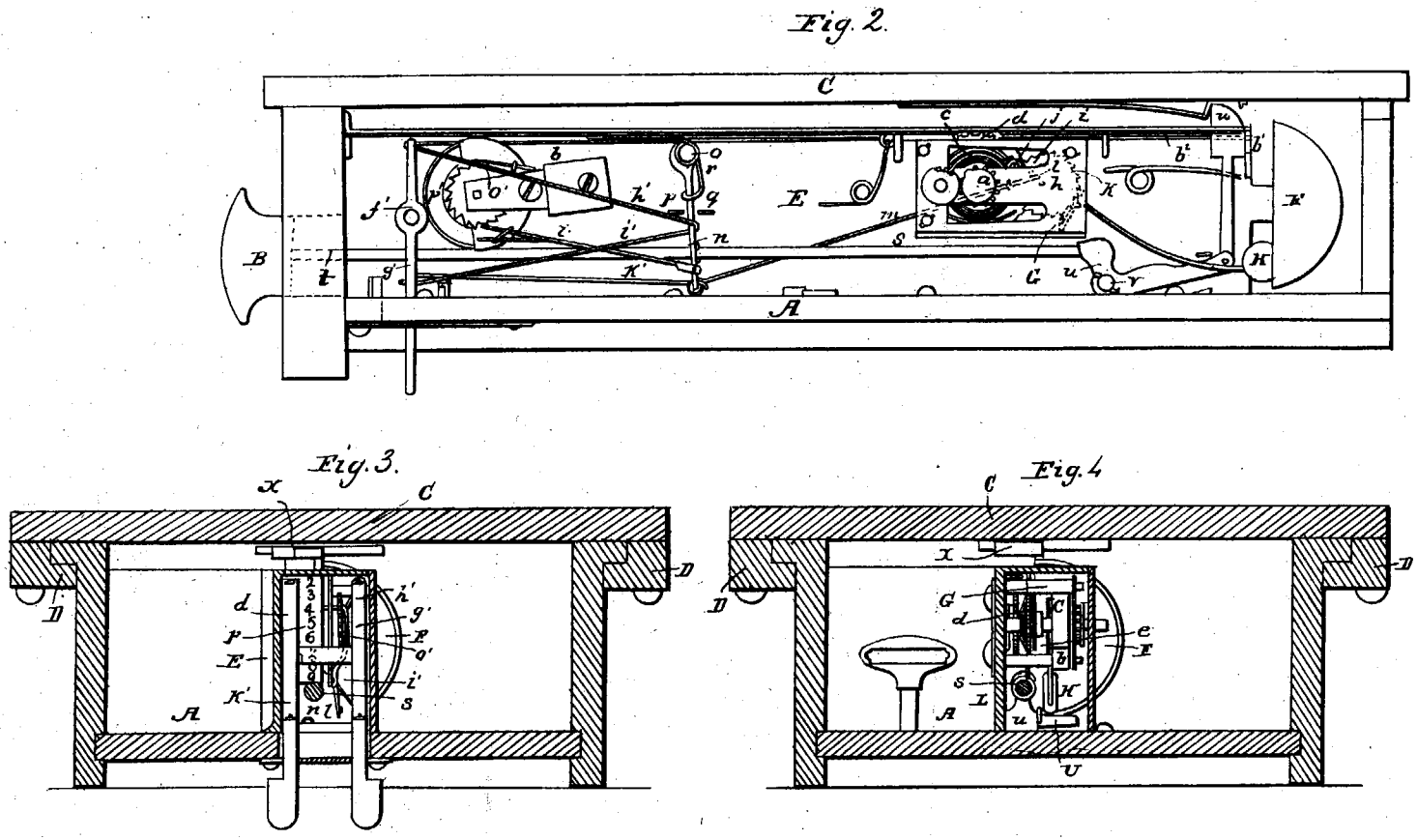
N. PETERS. Photo-Lithographer, Washington, D. C.

UNITED STATES PATENT OFFICE.

EPHRAIM BROWN, OF LOWELL, MASSACHUSETTS.

IMPROVED BURGLAR-ALARM.

Specification forming part of Letters Patent No. 11,856, dated October 31, 1854; Reissue No. 924, dated March 6, 1860.

*To all whom it may concern:*

Be it known that I, EPHRAIM BROWN, of Lowell, in the county of Middlesex and State of Massachusetts, have invented a new and useful thief-detecter or alarm apparatus to be applied to money-drawers in order to give notice when any improper attempt is made to open the same; and I do hereby declare that the same is fully described and represented in the following specification and the accompanying drawings, letters, figures, and references thereof.

Of the said drawings, Figure 1 denotes a top view of the drawer with my said invention applied to it. Fig. 2 is a sectional view of the drawer, and made to show a side elevation of the mechanism contained therein, the side plate of the case of said mechanism being removed in order to more clearly exhibit the parts in rear of it. Fig. 3 is a vertical and transverse section of the drawer, such section being taken in front of the two keys, to be hereinafter described, or between them and the knob, and so as to exhibit them and the counter mechanism. Fig. 4 is another such section taken just in front of the alarm mechanism.

In the said drawings, A denotes the drawer, of which B is the knob, by which said drawer is usually operated or pulled outward. C denotes the counter or board under which the drawer is placed and made to slide in and out on rails D D. Throughout the middle of this drawer, in case a single knob is used on it, I arrange the case of the alarm apparatus or detecter, as seen at E, placing at the rear end of this case and within the drawer a bell, F. In front of the bell, and within the case, is placed an alarm-striking apparatus, as seen at G. The hammer of this alarm is shown at H, such alarm apparatus being of the kind commonly sold in the market and applied to clocks for the purpose of converting them into alarm-clocks. A top view of the alarm apparatus I have given in Fig. 5, and a central and longitudinal section of it in Fig. 6. As it is an apparatus well known to all clock-makers, it will only be necessary for me briefly to describe its principal parts. It consists of a driving or key shaft, *a*, to which, and the case *b*, a coiled or spiral spring, *c*, is adapted, so as to rotate the shaft in a direction opposite to that in which said spring may be wound up. *d* is a key-wheel playing loosely upon the wheel-shaft. *e* is a ratchet fixed upon the key-shaft and working against a spring-pawl, *f*, adapted to the side of the gear. The said gear plays in a lantern-pinion, *g*, fixed upon another shaft, *h*, carrying an escapement-wheel, *i*. To this escapement-wheel the hammer of the bell is connected by an escapement, *k*.

When the mainspring is wound up and set free, it will so set in operation the mechanism as to cause a constant succession of blows of the striking-hammer upon the bell E to take place. There projects from the inner side of the escapement-wheel a pin or stop, *l*, which operates in connection with an alarm-pawl, *m*, that extends along underneath the key-shaft, and jointed at its front or lower end to a movable hanging lever, *n*, which plays or oscillates on a pin, *o*, and between two stop-studs, *p q*. When this hanging lever is drawn in a direction toward the knob, it will cause the alarm-pawl to be drawn from underneath the stud or pin of the escapement-wheel, so as to permit the said escapement to revolve. The return movement of the hanging lever forces the alarm-pawl in the path of rotation of the said stud or pin, and when said stud or pin strikes upon the pawl its further rotation will be arrested by said pawl. A spring, *r*, is applied to the hanging lever to force it in a direction toward the alarm apparatus. Through said hanging lever a long rod, *s*, is made to slide, such rod at its front end being attached to the knob, which is made to slide freely in an axial direction in a passage or opening, *t*, formed in the front board of the drawer. This rod presses against the shorter vertical arm of a bent lever, *u*, that plays upon a fulcrum, *v*, and has its longer arm jointed to a vertical latch or spring bolt, *w*, arranged as seen in the drawings, and made to operate in connection with an inclined catch, *x*, fixed underneath the counter-boards, as seen in the drawings. When the knob is pressed inward, the spring-bolt will be forced downward. A locking bolt or wire, $b^2$, is applied to the latch-bolt. It extends and slides through the latch-bolt and passes into the end part, $b'$, of the case. While it is in said part $b'$ the bolt is prevented by it from being depressed, or is locked in position;

but when it is drawn out of the said part $b'$ the bolt is set free so that it may be moved downward by pressing the knob inward. This locking bolt or wire is jointed to the upper arm of a key-lever, $d'$, which plays upon a stationary pin or fulcrum, $f'$, and has its tail or lower arm extended through the bottom of the drawer. There is also another such lever placed upon the said pin, as seen at $g'$. This latter lever should be so connected to the hanging lever before mentioned, by means of draft-rods $h'$ $i'$, or other suitable devices, that any movement of the lever $g'$, either backward or forward, shall cause the hanging lever to be drawn toward the knob, and so as to cause an alarm to be sounded. The hanging lever is also connected with the first key-lever by means of a connecting-rod, $k'$, and so that said hanging lever may be drawn toward the knob whenever the lower arm of the key-lever is pulled toward the same. The hanging lever carries an impelling-pawl, $l'$, which works against a ratchet, $n'$, fixed upon a horizontal shaft, $o'$, made to carry a registering or counter wheel, $p'$, whose circumference is divided into the same number of parts that there are in the ratchet-wheel, the parts being designated by the figures 1, 2, 3, 4, &c. Directly over this wheel there is a slot or orifice, $q'$, made through the top plate of the case of the alarm apparatus, and so as to have a width corresponding to one of the divisions of the counter-wheel. The object of this counter-wheel is to enable a person to ascertain at any time what number of attempts may have been made to open the drawer, as the counter-wheel will be moved one division whenever either of the lower arms of the key-lever are moved so as to cause an alarm to be sounded. It will also be moved one division whenever the knob is moved so as to sound an alarm.

When a drawer is fitted up with a thief-detecter of the above description, and the main-spring alarm apparatus is wound up, the drawer being supposed to be locked by the spring-bolt, the natural method by which a person who did not know that the drawer had an alarm apparatus applied to it would attempt to open the drawer would be to seize upon the knob and pull it toward him. When this is done it will readily be seen not only that the drawer cannot be opened, but that an alarm will be sounded. In order to open the drawer a person must press inward the knob with the thumb, extending the fingers of the hand under the drawer and against that part of the back side of the front board of it which projects below the drawer. He must also pull the drawer toward him and at the same time press with one of the fingers of this hand against the left-hand key-lever so as to unlock the spring-bolt and permit it to be depressed by the pressure exerted against the knob.

The secondary or right-hand key-lever is a decoy-key, it being connected with the hanging lever for the purpose of deceiving a thief or person not acquainted with the mechanism. Whenever it is moved it will cause an alarm to be sounded.

What I claim as my invention is—

1. The making of the knob of a drawer movable, and so combining it with an alarm apparatus as to cause an alarm to be sounded whenever an attempt to open the drawer by pulling on the knob is attempted.

2. The combination of the latch or spring bolt and the secondary bolt and key or lever with the movable knob and the drawer, the same being to operate together, as specified.

3. The combining of the alarm-pawl $m$ with the knob-rod by means of a movable hanging lever, $u$, to be operated or moved by a stud or its equivalent fixed in the knob-rod.

4. The combination of a decoy-key or an auxiliary alarm-springing mechanism with an alarm-giving apparatus, its springing device, and a latching or bolting apparatus applied to a drawer or its equivalent, the said decoy-key or auxiliary alarm-springing mechanism, when put in motion, operating to set in movement the said alarm-giving apparatus, so as to cause it to sound an alarm, as it would be caused to do by reason of any movement of its main springing device.

5. Connecting the decoy-key with the hanging lever so as to operate as specified, also connecting the said hanging lever to the secondary lever so that a forward pull on the secondary lever shall move the hanging lever so as to effect the sounding of the alarm.

6. The combination of the counter or numbered wheel and its operative mechanism with the knob-rod, the same being to exhibit the number of the attempts at opening the drawer—meaning also to claim the so combining the operative mechanism of the counter-wheel with the hanging lever that a movement of the latter will effect a movement of the said wheel.

In testimony whereof I have hereunto set my signature this 14th day of January, A. D. 1860.

EPHRAIM BROWN.

Witnesses:
R. H. EDDY,
ARTHUR NEILL.